CONVERSION AND STORAGE OF SIGNALS

Original Filed Oct. 22, 1956 6 Sheets-Sheet 1

Inventor
Gerhard Dirks

By Shoemaker & Mattare
Attys

Oct. 8, 1963 G. DIRKS 3,106,336

CONVERSION AND STORAGE OF SIGNALS

Original Filed Oct. 22, 1956 6 Sheets-Sheet 2

Inventor
Gerhard Dirks
By Shoemaker & Mattare
Attys

Oct. 8, 1963 G. DIRKS 3,106,336

CONVERSION AND STORAGE OF SIGNALS

Original Filed Oct. 22, 1956 6 Sheets-Sheet 3

Inventor
Gerhard Dirks

By Shoemaker & Mattare
Attys

CONVERSION AND STORAGE OF SIGNALS

Original Filed Oct. 22, 1956 6 Sheets-Sheet 4

Inventor
Gerhard Dirks
By Shoemaker & Mattare
Attys

Inventor
Gerhard Dirks
By Shoemaker & Mattare
Attys

INVENTOR
Gerhard Dirks
BY Shoemaker & Mattare
ATTORNEYS

United States Patent Office 3,106,336
Patented Oct. 8, 1963

3,106,336
CONVERSION AND STORAGE OF SIGNALS
Gerhard Dirks, 12120 Edgecliff Place, Los Altos Hills, Calif.
Continuation of application Ser. No. 617,524, Oct. 22, 1956. This application Dec. 19, 1961, Ser. No. 161,772
Claims priority, application Great Britain Oct. 21, 1955
14 Claims. (Cl. 234—5)

The present invention relates to a means for producing pulse sequences representative of code combinations.

The present application is a continuation application of my pending application Serial No. 617,524, filed October 22, 1956, entitled "Conversion and Storage of Signals," now abandoned.

In the teleprinting art and in certain other arts, combinations of code elements such as permutation bars and the like are frequently used for the representation of characters, whether numerical characters or alphabetic characters or the like, and it is the object of the present invention to provide means for converting such code combinations into corresponding pulse sequences or pulse trains so that they may be transmitted for example to distant places and/or made to operate printing or other apparatus.

According to the invention each element of a code and therefore each combination of elements has a numerical value assigned to it and the selection of each combination of code elements generates a corresponding train of pulses equal in effective value to the total numerical value of the elements in the selected combination. For instance, the generated pulses may be equal in number to the total number represented by the selected elements or to some multiple or other predetermined ratio of that total number. In this way, each combination of code elements may be regarded for example as a binary number, and the translation of that number into, for example, a decimal system will give a basis for the number of pulses in a sequence having the same significance.

In accordance with the invention, each element of the code is adapted when selected to control corresponding circuits to transmit a corresponding number of pulses.

Each code element may be coordinated to one or more voltage or current values in dependence on its said numerical value, these voltages or currents being adapted to influence pulse generating means in such a way that the pulse sequences generated are of the required number for each such element. The said voltages or currents for the selected code elements may be effective successively. Alternatively, they may be combined so as to be effective simultaneously.

The circuits mentioned above may be controlled by electronic, magnetic or contact switches or the like and may be operated by depression of the selected keys of a keyboard or by any other suitable direct input means. Alternatively, the switches may be operated by relays energized from teleprinting lines, punched cards, the output of a computer or by other record means. Still further, said switches may be operated by electronic or magnetic storage means having two or more stable conditions.

In accordance with another feature of the invention, signal storage devices are provided for the recording of information as signals stored in a record means, for instance where such record means is to be used later for the operation of a mechanism by which the signals will be retranslated into a text or the like, and in this connection the invention has special adaptability for the storing of signals whose said later use is for the operation of a mechanism which in different circumstances will require different degrees and/or different phases of operation.

One important use of the invention is for the storing of signals as perforations in a tape or the like for the subsequent operation of a line-composing machine, the successive characters of a text being stored as perforations in respective combinations of a code in successive positions on the tape or the like, but with which it is desired to know, for justification purposes, the total width of the text of a line or part of a line, in terms of pre-selected units, e.g. those at present used in line-composing machines. The invention may also be used where the signals are stored otherwise than by punching, e.g. on a magnetizable tape.

The invention may therefore comprise in combination an input means such as a keyboard means for selecting combination signals in dependence on the operation of the input means and a control means for the recording of the selected combinations of signals and for counting units of width of characters represented by those signals.

The selected combination signals will be converted into pulses for the operation of the perforating unit or other storage device in such a way that not only will the pulses operate the required elements in the perforator in dependence on the character to be stored, but also a count of the said pulses will indicate the respective widths of the characters, for instance to effect an automatic justification.

Thus, according to one main feature of the invention the device includes in combination a keyboard with a control means for selective combination signals for recording and counting selectively according to letter widths.

The control means may, for example, be electrically operated control means and may include rotatable elements with, for example, permanent signals constituted by permanent magnets or constituted by optical markings or such signals may be recorded magnetically on a suitable record means. In each case they may have a local and/or timed significance for corresponding local and/or timed selection. The sensing means may be in parallel, e.g. by tracks and/or time periods of rotation, or the sensing means may operate serially. Furthermore, the record means may be a matrix of cores.

As regards the keyboard, any suitable switching arrangement may be employed, such as, for example, diodes or a contact matrix or a core matrix. Furthermore, there may be contact bars with combination contacts and movable between operative and inoperative positions in well known manner, such contact bars having slots in one edge or having contoured edges and/or having contacts in combination positions.

Such an assembly of contact bars or other combination elements may be interchangeable with others giving different combinations.

According to another feature of the invention a plurality of exchangeable storage means is provided within or for a machine, coordinating different combination signals to the respective keys of the keyboard selectively in dependence on different type faces made operative by the same keys.

This exchangeable or interchangeable means may be a rotatable means, having registering means so that various exchangeable elements are properly associated together and with the machine, or may be exchangeable matrices, or a multiple arrangement of exchangeable contact bars having slots or contoured edges or combination contacts as above. The means for selecting the different combination signals may include control switches for effecting a selection between the various exchangeable or interchangeable means according to coordinated type magazines which are to be used. The same switches may control the selection and the combination signals for selection of one of the type magazines within the composing machinery. The switches may be controlled by keys or the depression of keys may control also indicating devices such as optical indicating devices including an assembly of various lamps as described below or there may be electromechanical indicating means.

There may be printed ribbons of different colors with or without switches of different colors for selection and the number of the magazine employed may be printed down.

Still another feature of the invention is the provision of an electronic reduction gear between a counting device and an indicating device, which electronic reduction gear delivers an operative signal (pulse) for the indicating device at determined numerical values. The reduction gear may emit a signal when the passing of a determined stage of a counting stage tube takes place, or a signal may be released as a carry signal from a determined stage of a counting chain, which may be an electronic or a magnetic chain. Furthermore, the signal may be released as a carry signal from a last stage of a multistage tube. An electromagnetic reduction gear may deliver a signal as a carry signal from a relay chain or a signal may be delivered at the passing of a determined stage in a relay chain. The counting chain associated with the reduction gear may be of any of the forms mentioned above and may deliver a signal to the indicating device, for example, as a carry signal or when there is the passing through of a determined stage of a counting chain.

Again, the invention may provide the combination with an intermediate storage of a cyclic storage. The intermediate storage may be for at least two lines of characters used alternately. There may be a selection of storage localities in dependence on the movement and/or position of the paper carriage in the machine. There may be combination signals selection, for example, binary combinations, effected by actuating combinations of contacts according to the movement of the paper carriage in the machine. Again, there may be a direct selection of combinations by a ten group selection.

One group of storage localities may be actuated by the keyboard according to one line, whereas the second group is operative to control the record unit for the preceding line. There may be groups of storage localities for more than one line, and correction (including erasing) takes place within one line before the storage localities control the recording unit. The selection of the respective locality for correction is under the control of the devices mentioned above, that is, the selection of intermediate storage localities.

The intermediate storage may be of the cyclic magnetic type preferably magnetic disc or drum. Selection may be made by a counting device into which a number of the selected area is put and which releases a selection control signal when sensing or recording means operate in the selective sector. There may be switching from one sector to the other by adding a number, for example 1, to the count. There may be an exchangeable layer or an exchangeable film to carry the recordings with suitable registration devices.

Furthermore, the invention provides a keyboard in which the keys have a double significance; first for the usual meaning of the keys, and second, after the depression of a control key or actuation of a switch, for control commands or other significance.

The control functions may be expressed by the usual characters on the keyboard, each controlling at least two combination signals selectively. For indication as to which function (first or second) is to take place, there may be printed indications. The respective characters may be coordinated, for example, 1 may be read for swtiching to type magazine one, 2 for magazine two, 3 for magazine three, 4 for magazine four and 5 for quadding.

The depression of a special key may actuate a switch for a permanent switching over to a second meaning until another key depression of the same or another key releases it, or the special key may be operative like the shift key of a typewriter. There may be special switches with two switching functions which may be operated accordingly.

An advantage of the invention is that it allows a selection amongst a number of storages of different signals, that is, for different kinds or "cases" of type characters, for operation of the same perforating or other recording means and with the use of the same pulse counting means.

In order that the invention may be readily carried into effect, it will now be described with reference to the accompanying drawings, wherein.

The components of the apparatus of the present invention, with the exception of the character width count magazines 16[1], 16[2] and 16[3] and the selective switching means 60[1], 60[2] and 60[3], may comprise any suitable means known in the art. Thus, for example, suitable time selecting means 11, 12, 13 may be that shown by U.S. Patent No. 2,540,654 issued February 6, 1951 to Cohen et al.; suitable line length and space counter means 28 and 29 and suitable keyboard means 3 may comprise those shown by U.S. Patent No. 2,069,240, issued February 2, 1937 to Goetz et al., U.S. Patent No. 2,019,505, issued November 5, 1935 to Reiber and U.S. Patent No. 1,984,317 issued December 11, 1934 to Reiber et al.; and suitable remaining line space indicating means 34 (one and two finger systems) may comprise those shown by U.S. Patent No. 2,043,231, issued June 9, 1936 to Bracken et al. and U.S. Patent No. 2,024,006, issued December 10, 1935, to Krum et al.

Figure 1:
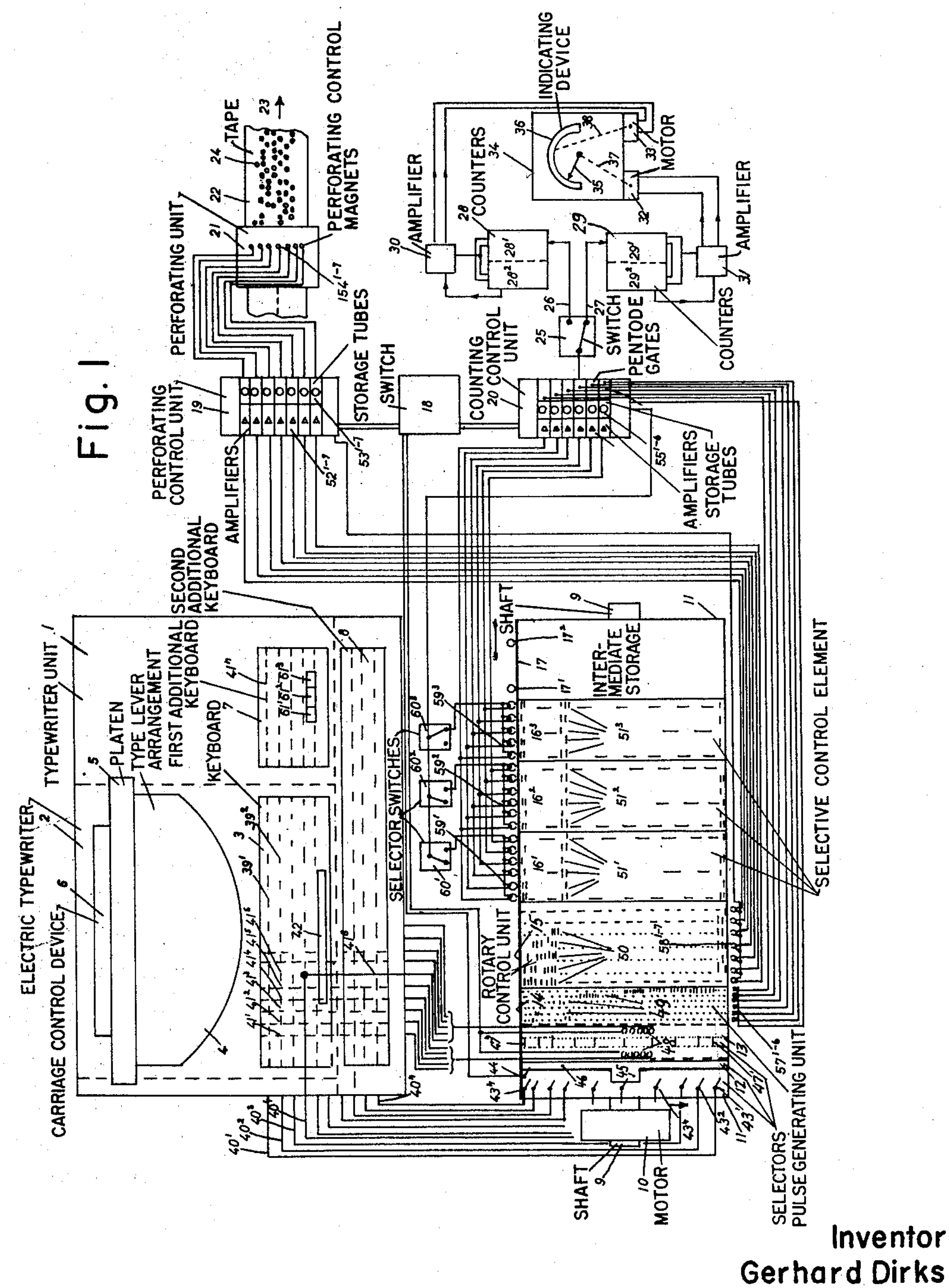
FIG. 1 is a schematic diagram of an embodiment of the combination of a typewriting unit of the present invention with selective rotary storage elements supplying character representing pulse sequences, and a tape perforating unit along with a pulse counting unit.

Referring first to FIG. 1, the typewriting unit 1 comprises a conventional electric typewriter 2 with keyboard 3, the type lever arrangement 4, platen 5, and the carriage control device 6. The unit 1 has a first additional keyboard 7 and a second additional keyboard 8. Both additional keyboards are necessary in order to provide a sufficient number of keys for the control of line-composing machines.

A rotary element is shown, comprising a number of pulse generators for coded signals. These are mounted on shaft 9, driven by motor 10, for example, at a speed of approximately 1500 r.p.m. A plurality of exchangeable rotary elements are mounted on the shaft 9. The time selector rotary elements 11, 12 and 13 are provided for the control of selecting units as explained below and they themselves operate under the control of depressed keys of one of the keyboards 3, 7 or 8. These elements make effective electronic switching paths during time intervals determined by the significance of such keys.

The rotary element 14 is a pulse generating unit or binary to pulse converter comprising in its different circumferential tracks a determined number of pulse-generating elements, consisting of permanent magnets set in a non-magnetic carrier. The pulse generator may comprise, for example, in the first track from the lefthand side one element, in the second track two elements, in the third track four elements, in the fourth track eight elements, in the fifth track sixteen elements, and in the sixth track thirty-two elements. Other tracks with more elements could be provided if required, according to the code used. The magnets may comprise magnetic sheets of the thickness of .01 of an inch, which are arranged circumferentially in slots in a carrier of non-magnetic material.

The rotary control unit 15 is an exchangeable element comprising within seven circumferential tracks other pulse generating magnets, these being arranged so that all required character code combinations are available in said tracks. Each sector or axial line of the rotary control unit 15 provides a code combination different from those in all the other sectors, each combination being coordinated to a certain character or control function, and any sector may be selected within each rotation of shaft 9, under control of the selecting means 11, 12 and 13 and in dependence on a depressed key in one of the keyboards 3, 7 or 8. The pulse-generating means in said different tracks may likewise be permanent magnets positioned in slots in a carrier of non-magnetic material. To allow for the requirements of typesetting in different languages with different type systems the whole rotary unit or control generator 15 may be exchanged for another one suitable to the respective type system of said language, so that there may be any selected relation between the operation of the keys of the keyboards 3, 7 and 8 and the resulting combination signals produced by the pulse generator controlling the conventional perforating unit 21 for tape 22.

Three selective control elements or count magazines 16$^1$, 16$^2$ and 16$^3$ are mounted on the shaft 9. Each of the selective control elements has pulse generating means 51$^1$, 51$^2$, 51$^3$, respectively, adapted to indicate the number of type width-units required by the individual letters of the alphabet of a language. In a particular sector, the different control elements 16$^1$, 16$^2$ and 16$^3$ indicate different width unit equivalents of different type sizes of the letter represented in a corresponding sector of rotating control unit 15. This possibility of selection of type size by alternately operating one or another of the selective control elements or count magazines 16$^1$ 16$^2$, 16$^3$ is useful if for example a line-composing machine has to set different sizes of letters within one line. Each of the selective control elements or type face character-width count magazines 16$^1$, 16$^2$ and 16$^3$ is exchangeable so as to allow any combination of sizes of letters within a line, according to different type magazines of the composing machinery. There will be mounted on shaft 9 as many of such selective control elements or count magazines 16$^1$, 16$^2$, 16$^3$ as there are different type size magazines within the composing unit, in order to allow any combination of sizes of types within a line without the necessity of changing the control units for the different type-width when counting the length of the line for determining justification factors.

Another rotary element 17, which preferably is a magnetic storage drum or the like, allowing an intermediate storing and/or supplying of control pulses, is mounted on the shaft 9. The intermediate storage element 17 may be used to record the pulses for one or more lines before such pulses are delivered to the perforating unit 21, in order to allow corrections before the actual punching operation takes place. If such an intermediate storage is provided, the selective recording in its different areas may take place in dependence on the relative position between the carriage or platen 5 and the typing unit itself; that is, according to the type position in the line as indicated by the carriage control device 6 which may comprise, for example, a contact column commutator unit.

The sensing of permanent or recorded pulses from elements 13, 14, etc. takes place by sets of magnetic sensing heads. The sensing heads are positioned opposite the respective tracks of each of the described elements 13, 14, 15, 16$^1$, 16$^2$, 16$^3$ or 17. The sensing heads coordinated with element 13 are shown in serial arrangement at 48, whereas the sensing heads for the control elements 14, 15, 16$^1$, 16$^2$ and 16$^3$ are shown in parallel arrangements within six or seven tracks of such control elements as shown in FIGURE 1 by numbers 57$^{1-6}$, 58$^{1-7}$, 59$^{1-3}$. The sensing heads coordinated with the magnetic drum 17 may be mounted for movement parallel to the axis of the drum to provide track selection as indicated by the double arrow at 17$^2$, or in a fixed arrangement as indicated at 17$^1$.

The selection of signals from a particular section representing a selected character by the cooperation of the keyboards 3, 7 or 8 with the selecting means 11, 12 and 13, controls the amplifying means of a perforating control unit 19 and of a counting control unit 20 via the electronic double-stage switch 18. The double-stage switch 18 receives a pulse for rendering operative the amplifiers of the units 19 and 20 from the selecting means 11, 12 and 13 at that instant in the rotation of the shaft 9 when the circumferential sector coordinated with the depressed key is passing the related sensing heads. The switch 18 also receives pulses for rendering inoperative units 19 and 20 at the end of each such sector. The control of the amplifiers of units 19 and 20 allows the operation of electronic storage means within said units only for a selected time interval corresponding to a particular sector, in dependence on the depressed key, by the combination pulses delivered from the sensing heads 58$^{1-7}$ to control unit 19 and sensing heads 59$^1$, 59$^2$ or 59$^3$ to control unit 20.

The control of the amplifiers 52$^{1-7}$ of the perforating control unit 19, and of the amplifiers 54$^{1-6}$ of the counting control unit 20, may be effected by controlling one of the grids of the amplifier tubes, for example, their screen grids, by voltages generated as a voltage drop across one or more resistances within switch unit 18. The electronic storages which are set in dependence on the character code pulses selected from rotary control unit 15 may be gas discharge tubes, such as, for example, thryatrons, which in turn control the magnets of the perforating unit 21. The set of thyratrons is indicated at 53$^{1-7}$ and the set of perforating control magnets is shown at 154$^{1-7}$ within perforating unit 21. The perforated tape is shown at 22, with holes 24, and is moved in the direction 23.

The sequence of operations involved in punching a character code in the tape may thus be summarized as follows. The shaft 9 carrying the pulse generator elements 13, 14, etc., is continually rotated by the motor 10. The pulses generated by the heads 48 of the element 13 are not applied to the switch unit 18 because no key of the keyboard is depressed. The switch unit 18 holds the amplifiers 52$^{1-7}$ of the punch control unit 15 inoperative, so that signals from the heads 58$^{1-7}$ of the character code generator element 14 are not passed by the amplifiers 52$^{1-7}$ to the temporary storage thyratrons 53$^{1-7}$. Now suppose that a key, representing the letter "A" for example is depressed. The heads 48 will be allowed to apply one signal to the switch unit 18. The interconnections between contacts operated by the keys and the heads 48 are such that this signal occurs at the time when the sector of the rotary control unit 15 which contains the particular combination of magnets required to represent the letter "A" in the tape punching code is about to pass the heads 58$^{1-7}$. The switch unit 18 will render operative the amplifiers 52$^{1-7}$ to pass the "A" code signals to fire the thyratrons 53$^{1-7}$ in a corresponding pattern. The switch unit 18 is reset after the passage of the selected sector, thereby preventing the application of any further signals to the thyratrons. The fired thyratrons energize the corresponding one of the punch magnet 154$^{1-7}$ to punch the "A" code in the tape 22. The punching operation automatically causes a single step feed of the tape 22 and extinguishing of the thyratrons in the conventional manner. The next character is then punched in a similar manner on depression of another key of the keyboard.

The operation of the counting means 29 in dependence on combination signals provided by the rotary elements $16^1$, $16^2$ or $16^3$ is based upon similar processes. The depressing of one of the keys $61^1$, $61^2$ or $61^3$ of the first additional keyboard 7 decides the selection of one of the selective control elements $16^1$, $16^2$ or $16^3$. Each selective control element or count magazine $16^1$, $16^2$ and $16^3$ is coordinated with a specific size or font of type in correspondence with a type magazine in a composing unit which is to be subsequently controlled by the tape 22. Such selection is effected by operating one of the selector switches $60^1$, $60^2$ or $60^3$, which may comprise, for example, relays with holding contacts.

One of the sets of sensing heads $59^1$, $59^2$ or $59^3$ is made effective by one of the switches $60^1$, $60^2$ or $60^3$. The sensed signals from those sensing heads are delivered to the counting control unit 20. They enter the amplifiers $54^{1-6}$ which, as described above, operate under control of the switch unit 18. The electronic storage tubes $55^{1-6}$ are thus operated selectively according to the combination of signals sensed by the selected set of sensing heads $59^1$, $59^2$ or $59^3$. Pentodes $56^{1-6}$ are controlled by the electronic storage tubes $55^{1-6}$. These storage tubes may, for example, be flip-flops.

In consequence of the rendering operative by one of stages $55^{1-6}$ of one of the pentodes $56^{1-6}$, signals sensed by sensing heads $57^{1-6}$ in succession, represent successive digit values 1, 2, 4, 8, 16, if necessary 32, and even 64, are selectively fed to the counters $28^{1-2}$ or $29^{1-2}$ providing in dependence on the selected combination, an increase in the count equal to the number of width units appropriate to the character which is being recorded. Switch 25 is operative in such a way that it connects to line 27 when the usual type levers are pressed down, and to line 26 when a space key 42 is depressed. The two-denomination electronic counter 29 having multistage tubes $29^1$ and $29^2$ combined by a carry-device receives and counts as many pulses as correspond to the total number of width-units of the letters entered by the keys.

The counters $29^1$, $29^2$ are arranged in such a way that only after each 100 pulses a pulse will be fed, e.g. as a carry pulse, from the counting stage $29^2$ to the indicating device 34. Alternatively such a carry pulse may be released after a count of say 30, 32, 50 or some other number.

These pulses are delivered by amplifier unit 31 to a step-switch gear operating the indicator needle or arm 35. Such gear may be of an inductive pulse motor type and a mechanical reduction gear may be included.

It has already been mentioned that it is intended that the tape 22 should be in a form suitable for controlling a tape operated composing machine. It is desirable therefore, that the line length of the matter entered by the keyboard should be such that it is suitable for justification by the composing machine when the tape is used to control it. For this reason, the conventional type of justification indicator is provided showing the relation between the total numbers of width units corresponding to both the characters and spaces, respectively, of the line at any time. The operator may judge from the indicator when to start a new line in order that the tape will be correct for controlling subsequent justification.

The manner in which the indicator is operated may be summarized as follows. In the present case, the switch $60^3$ is closed, so that the heads $59^3$ are operatively connected to the amplifiers $54^{1-6}$. The amplifiers $54^{1-6}$ are made operative for one sector by the switch unit 18 at the same time as the amplifiers $52^{1-7}$. The sector of the third type face character-width count magazine $16^3$ which is sensed during this time contains a pattern of magnets representing in binary form the number of width units occupied by the letter "A" in the particular font in which this letter is to be finally printed. For example, if the letter is equivalent to seven width units, then heads $59^3$ connected to the amplifiers $54^1$, $54^2$ and $54^3$ will generate signals. Accordingly, the storage tubes $55^1$, $55^2$ and $55^3$ will be operated to render operative the pentode gates $56^{1-3}$. Now the gates $56^{1-3}$ receive, respectively, 1, 2 and 4 pulses from the heads $57^1$, $57^2$ and $57^3$ during a revolution of the shaft. Hence seven pulses are fed to the counter 29. If the space key had been depressed, instead of a letter key, the switch 25 would have been in the other position and the appropriate number of pulses would have been fed to the counter 28. The indicator 34 is operated by the carry pulses from the counters 28 and 29. It will be noted that the pattern sensed from the third type face character-width count magazine $16^3$ is stored in the tubes $55^{1-6}$, so that the counter input may occupy up to one revolution of shaft 9, even though the amplifiers $54^{1-6}$ are operative for only one sector.

A counting mechanism formed by the counter stages $28^1$, $28^2$ controls via the amplifier unit 30 the inductive pulse operative motor 33 which moves the scale 36 about an axis 38, when space keys are depressed, such movement being in a counterclockwise direction. The arm or finger 35 moves in clockwise direction corresponding to the number of width units of the respective letters of a line, in dependence on counter pulses fed to the motor 32, whereas the scale 36 is moved counterclockwise by the system 33 thereby allowing the correct terminating of the lines by the operator.

Figure 2:
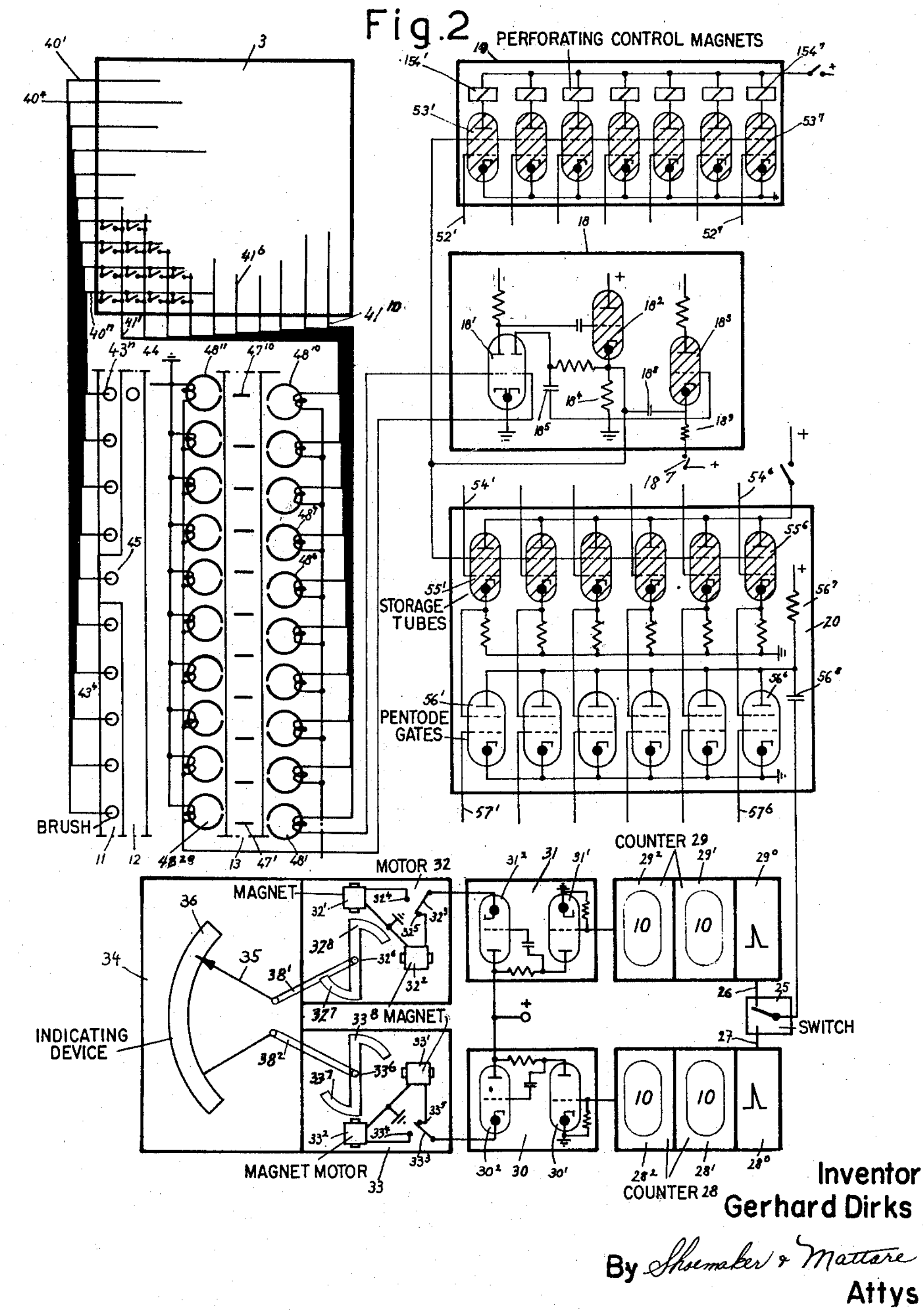
FIG. 2 is a more detailed diagram of certain parts of the embodiment of FIG. 1.

In FIGS. 1 and 2 rotatable elements indicate the code and the count in an interchangeable manner.

Figure 3:
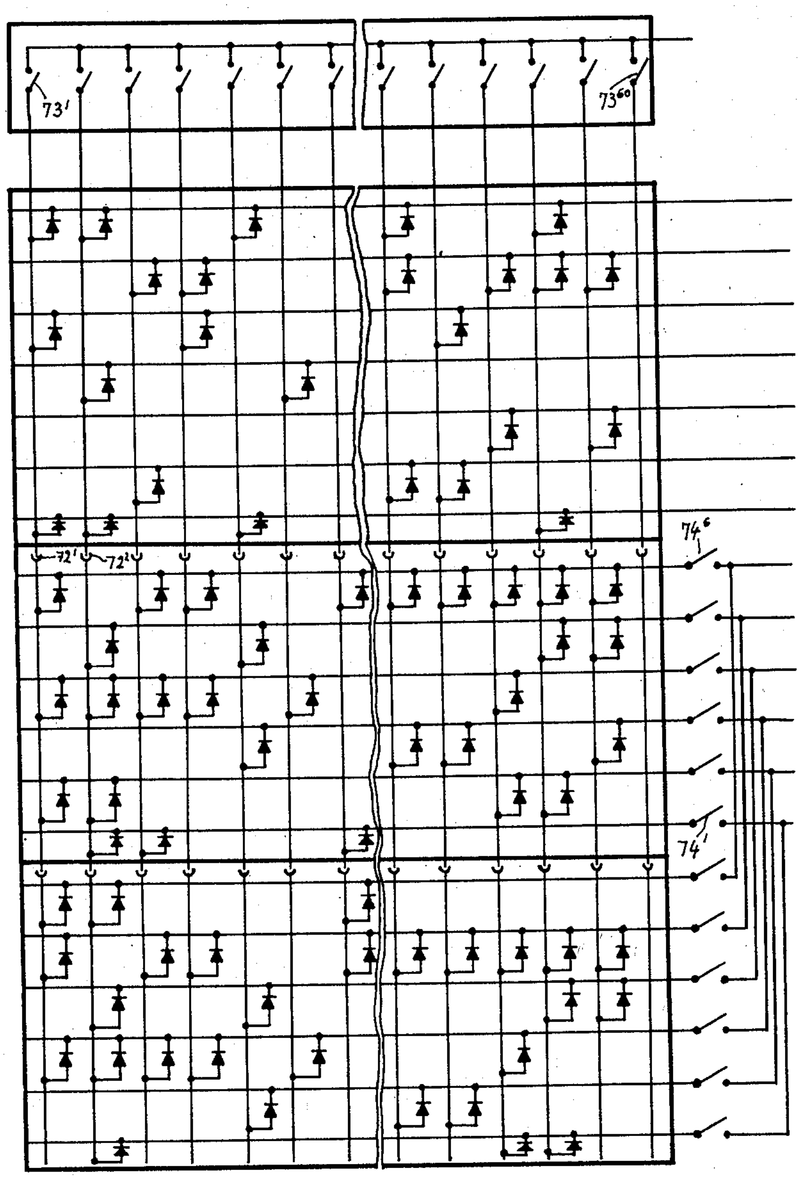
FIG. 3 is a schematic diagram of an embodiment of a selection circuit which may be operated by the keys of a keyboard.

FIG. 3 shows an alternate static arrangement for selectable coding and counting according to different characters. FIG. 3 is an embodiment of a diode matrix which may comprise part of a plug-in unit having inputs from each key and providing an output to those conductors which represent the code elements for the coded record or the count respectively.

Figure 4:
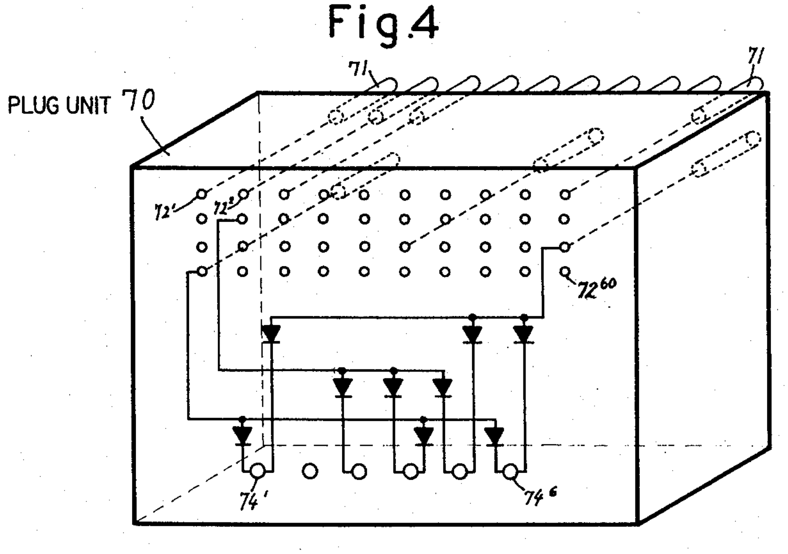
FIG. 4 is a perspective view of an embodiment of an exchangeable plug board or panel for selecting particular circuits.
Figure 5:
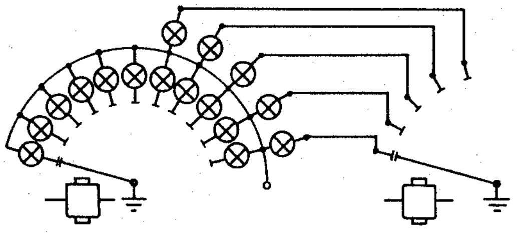
FIG. 5 is a schematic diagram illustrating an embodiment of an indicating arrangement.
Figure 6:
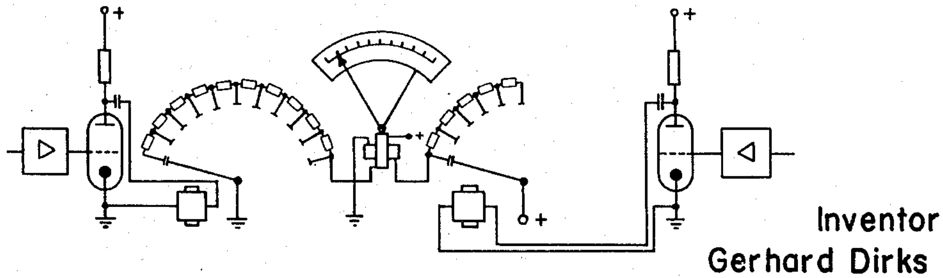
FIG. 6 is a schematic diagram illustrating another embodiment of an indicating arrangement.

FIG. 4 shows the plug unit 70 having the pins 71 on one side and connected with contact points $72^{1-60}$ for the input from the contacts $73^{1-60}$ below the keys as shown in FIG. 3. Furthermore, the plug unit 70 contains six contact points $74^{1-6}$ which are used as outputs for the coded elements, code representation of characters or count.

The time selector means 11, 12, 13 for the selection of a sector are shown in more detail in FIG. 2. Below keyboard 3 there is a cross-wise arrangement of contact bars in which each crossing point corresponds to a key of the keyboard which may be pressed down for indicating a certain character. By such pressing down of a key a connection is established between one pair of contact bars.

In the example of FIGS. 1 and 2 a depressed key makes a connection between the horizontal line $40^4$ and the vertical line $41^6$. The horizontal line $40^4$ is one of the plurality of horizontal lines $40^{1-n}$ representing one set of contact bars and the selected line $46^6$ is one of a plurality of vertical lines $41^{1-10}$ representing the other set of contact bars.

The individual contact bars $40^{1-n}$ are connected to individual contact brushes $43^{1-n}$ which are spaced apart in a circumferential direction around the periphery of the non-conducting element 11 (FIGS. 1 and 2). The member 11 includes a conducting portion 12, which has a segment 45 lying in the line of the brushes $43^{1-n}$. A common brush 44 is in contact with the portion 12 and is connected to ground. Hence the contact bars $40^{1-n}$ are grounded in turn through the related one of the brushes $43^{1-n}$, the segment 45, the portion 12 and brush 44, as the selector element 11 rotates with the shaft 9. When contact bar $40^4$ is thus grounded, the connection will extend through the closed switch operated by the depressed key, to contact bar $41^6$.

The contact bars $41^{1-10}$ are connected individually to one end of the winding of each of the sensing heads $48^{1-10}$. The other ends of the windings are connected in common to one grid of a double-triode $18^1$. The sensing heads sense a circumferential row of magnets $47^{1-10}$ set in the selector element 13. The spacing between the sensing heads $48^{1-10}$ differs from the spacing between the magnets $47^{1-10}$ to provide a vernier effect. During the period of rotation for which any particular brush 43 is grounded each of the sensing heads 48 will sense one of the inserts 47. While the brush $43^4$ is grounded, all the sensing heads 48 will generate a signal in turn, but there will be a completed circuit between the grid of the triode $18^1$ and ground only for the winding of the sensing head $48^6$ through the bar $41^6$, the closed switch, bar $40^4$, brush $43^4$, segment 45, portion and brush 44. Thus, only the signal from the sensing head $48^6$ will be effective at the triode grid. None of the other bars 40 are connected to any of the bars 41, so that only this one signal will be effective during a revolution.

In this way, ten possible signal times occur during the grounding of each bar 40. Thus the total number of times defined is ten times the number of bars 40. Each signal time corresponds to the passage of a different sector past the sensing heads $58^{1-7}$, $59^1$, etc., and each key controls the selection of a different sector.

The pulse sensed by sensing head $48^6$ is amplified in the left half of double triode $18^1$ and delivered to the discharge tube $18^2$ igniting it. The discharge tube produces a voltage drop across its cathode resistance $18^4$. The discharge tube is used for the control of the series of relay tubes $53^1$ to $53^7$ and $55^1$ to $55^6$. The voltage drop across the cathode resistor $18^4$ controls the screen grids of the discharge tubes $53^1$ to $53^7$ and $55^1$ to $55^6$ and the control grid bias of said discharge tubes is adjusted to such a value that an input signal to the control grid is effective to fire a tube only the screen grid voltage has been applied by conduction through the discharge tube $18^2$. The input signals come from the amplifiers $52^{1-7}$ and $54^{1-6}$ (FIG. 1). The cathode resistance $18^4$ delivers a voltage also to the anode of the right hand system of the double triode $18^1$, so that this system is prepared for amplification as soon as the discharge tube $18^2$ is ignited.

Therefore, signals sensed by the series of sensing heads $48^{11-20}$, which are a little different in timing from the series $48^{1-10}$ but are connected in parallel, may be delivered to the control grid of said right hand system of the double triode $18^1$ but may not be amplified before this right hand system is made effective under control of the ignited tube $18^2$.

The signals sensed by sensing heads $48^{11-20}$ will be delivered to discharge tube $18^3$ shortly after the ignition of discharge tube $18^2$. In dependence on these signals, discharge tube $18^3$ is ionized which effects an additional voltage rise at cathode resistor $18^4$ by the coupling of capacitor $18^8$. The discharge tube $18^2$ is thereby extinguished and the screen voltage is removed from all relay tubes $53^{1-7}$ and $55^{1-6}$, thus avoiding the possibility of making these tubes effective for one sector only, since an ionized tube will remain so, but an un-ionized tube cannot be fired under these conditions. It will be appreciated that this arrangement is a minor modification of that of FIG. 1 in that the control voltages, are applied to the thyratrons instead of to the preceding amplifier stages.

To the second control grids of the discharge tubes $53^{1-7}$ are delivered, in parallel, signals from the amplifier tubes $52^{1-7}$. They are sensed from the control generator 15 by the sensing heads $58^{1-7}$. Since, within each sector, there is contained a defined combination of such signals which is coordinated with a certain depressed key, those of the discharge tubes $53^{1-7}$ will be ignited which correspond to the sensed combination signals. In consequence, the magnets $154^{1-7}$ will be energized to control the respective punches to punch into the tape 22 (FIG. 1).

The discharge tubes $55^{1-6}$ are effective at the same time, as their screen grids are controlled by the voltage drop across the resistor $18^4$. The control grids receive signals in parallel channels from the amplifiers $54^{1-6}$. These signals are sensed by the sensing heads $59^1$, $59^2$ or $59^3$ in dependence on the switch position of the selector switches $60^1$, $60^2$ and $60^3$.

As the width of the type characters differ according to the pattern of type fonts, the signal generating means $51^1$, $52^2$, $53^3$ of the character-width count magazines $16^1$, $16^2$, $16^3$, respectively, differ from each other in a combination dependent upon the respective widths of the characters. If, for instance, character *m* would be counted as 100 width units and, for instance, character *n* would be counted as 50 width units, 100 may be represented by a signal in column 64, one in column 32, and another one in column 4; whereas 50 would be represented by a signal in column 32, in column 16 and in column 2 where each column corresponds to one circumferential row of elements.

Each of the dlischarge tubes $55^1$ to $55^6$ controls a corresponding one of the pentodes $56^{1-6}$ which are operative in dependence on the voltage drop across the cathode resistances of the discharge tubes $55^{1-6}$. The control grids of the pentodes $56^{1-6}$ receive their signals from the sensing heads $57^{1-6}$ of the bniary to pulse converter 14. The first circumferential row has one signal generating unit, the second row has two signal generating units, the third row has four signal generating units, the fourth row has eight signal generating units, the fifth row has sixteen signal generating units and the sixth row has thirty-two signal generating units. A seventh row, if required, would have sixty-four signal generating units. The pulse generating units 49 are on that half circumference of the pulse generating unit 14 which is at the opposite side from the elements 50, 51, so that the units 49 are sensed by the sensing heads $57^{1-6}$ in the second half of the rotation whereas the above mentioned combinations signals pass the respective sensing heads $58^{1-7}$ or $59^1$, $59^2$ or $59^3$, during the first half of the rotation.

The pulses delivered to the counting tubes are dependent on the combination selected by the sensing heads $59^1$ or $59^2$ or $59^3$, whichever had been connected into circuit by the selector switches $60^1$, $60^2$ or $60^3$. If, for example, "12" had to be counted into the counting tubes, it would have been expressed by "4" and "8," that is, by selection of signals in the 3rd, and 4th rows. In this case the discharge tubes $55^3$ and $55^4$ would have been ignited, and the respective pentodes $56^3$ and $56^4$ would have been made effective to develop pulses, in dependence on the signals at their control grids, and in series one after the other, across the resistance $56^7$, which is common to all the pentodes $56^{1-6}$. The voltage drop across the anode resistance $56^7$ will be applied through the capacitor $56^8$ to a selected one of the counting stages 28 and 29.

The selection depends on the switching position of switch 25, which is either in switching position 26 or 27. In switching position 26, the number of width units due to characters will be counted and in switching position 28 the width units due to spaces will be counted.

Those pulses will be counted which have been selected in dependence on the depressed keys and will be delivered to the electronic counter 29 which may consist of a pulse shaping stage $29^0$, a multistage tube $29^1$ and another multistage tube $29^2$. The multistage tube $29^1$ may have 10 stages and the multistage tube $29^2$ may have only 4 effective stages; that is, the count takes place from 4 (actually 40) back to zero. Of course, any other adjustment may be selected.

The pulses delivered from the second stage $29^2$ will be effective for the electronic control of an inductive pulse motor. The said electronic control may be the control unit 31 which has tube $31^1$ and the discharge tube $31^2$. Within the cathode circuit of tube $31^2$ is the switch $32^3$ which is either in the position $32^4$ or as shown in FIG. 2 in the position $32^5$. The switching over takes place automatically in dependence on the rotation of the armature $32^6$ having armature poles $32^7$ and $32^8$, which are shaped in such a way that they effect a rotary movement in dependence on which one of the two coils $32^1$ or $32^2$ is energized by the discharge tube $31^2$. The electronic counting arrangement 29 is therefore used as a dividing circuit, in this case, by 40, as tube $31^2$ will receive a pulse only after each 40 pulses which have been fed to the counting arrangement $29^{1-2}$; if the character *m* corresponds in width to 40 pulses, the pointer 35 will only switch over from one position on the scale to the next.

The switch contact $32^3$, with switching positions $32^4$ and $32^5$ may be built either in the form of a commutator or of a relay operated in dependence on the rotation of the shaft of the armature $32^6$.

A similar type of arrangement is used for the counting of the spaces and will be operative if switch 25 is in switch position 27. It contains, for example, pulse-shaping means $28^0$ and two multistage tubes $28^1$ and $28^2$, the latter having only four effective stages; that is, it switches back from 4 to zero. When reaching the value 4 (actually 40) it will deliver a pulse via the tube $30^1$ to the discharge tube $30^2$ which will operate the rotary pulse motor 33.

After 40 pulses have come into the circuit, the counter delivers one pulse which will operate either the coil $33^2$ or $33^1$ in dependence on the switch position of switch $33^3$, which again is operative in dependence on the armature $33^6$ with the poles $33^7$ and $33^8$. Connected to the rotary armatures $32^6$, $33^6$ are gears $38^1$ and $38^2$, respectively, of which the gear $38^2$ connects the drive to a device for moving the scale 36 which shows the minimum extent of the spaces, whereas the arm or finger 35 is driven by the gear $38^1$ according to the maximum number of steps used for the justification of the line. One form of mechanical construction for such an indicating device is described in detail in U.S. Patent No. 2,083,608 of June 15, 1937.

It is one of the features of the present invention that operating the keyboard 3 not only effects the perforation of the tape 22, but also may serve to make a visible record such as for or in a typewriter. This can be done by either a mechanical or an electrical means, for example if additional contacts are arranged below or in association with the keys of the keyboard. FIG. 1 shows the keys for the different functions which are usually contained in a typewriter, and keys for the selection of type magazines, for quadding (left and right) and so on.

This may be done as in FIG. 1, by the additional keyboards 7 and 8. In order to make a visible record for such depressions of keys which would be contained only in the keyboards 7 and 8, it may be advisable to use the keyboard 3 also for those functions in order to have a visible record. For example, keys for the visible print will be in black when those meanings are used which are characteristic of the keys of the keyboard and in red when a special control function is to be effective.

Instead of parallel sensing means, serial sensing means may be used. The successive sectors of the storage may be used in such a way that each sector contains the different pulse elements of one character, so that each sector may be looked upon as divided into code elements or other digit values. If, for example, the circumference contains on one half one hundred such sectors which have been used in parallel tracks, each with 7 or 6 code elements, so a sub-division of each track into 7×100 or 6×100 would allow the serial operation with the same effects as described above, but with one sensing means for each track.

Simplification could thereby be achieved as to the width of the arrangement. On the other hand, the selection means would have to contain other electronic distributing means to make a difference between the significance of the different code elements which are then recorded in each sector. Furthermore, instead of code elements, a number of pulses representing digit values could be utilized; for example, in such a way that five pulses would be the equivalent of digit value 5 and two pulses would be the equivalent of digit value two. Each sector would be made up of two subsectors, each containing pulses for the digit values, for example, 0–9. These pulses may be counted in known manner by a multistage counting tube for each denomination so that those counting tubes would be operated from such a sensing track and indicate the width of the characters, for example, by expressing the width of character *n* by the numerical value 40, of which 4 would be contained in the first sector as 4 pulses and zero as an indication in the second sector, either as 10 pulses or none.

The arrangements of the interchangeable rotatable rotary control unit or control generator 15, the character-width count magazines $16^1$, $16^2$, $16^3$ and the intermediate storage unit 17 on the shaft 9 may be such that they are operated from one common keyway of the shaft, or that some other registering means is provided, for example, pin-and-hole or pin-and-slot means. The permanent signals may also be obtained by cutting engravings into a magnetic or magnetizable surface and thereby generating pulses at the passing of such engravings over or under sensing heads.

Instead of rotary exchangeable or interchangeable control elements, non-rotatable control elements could be chosen, which may be selected in a changeable way by switching from one to the other by means of switching means.

Figures 8A, 8B:
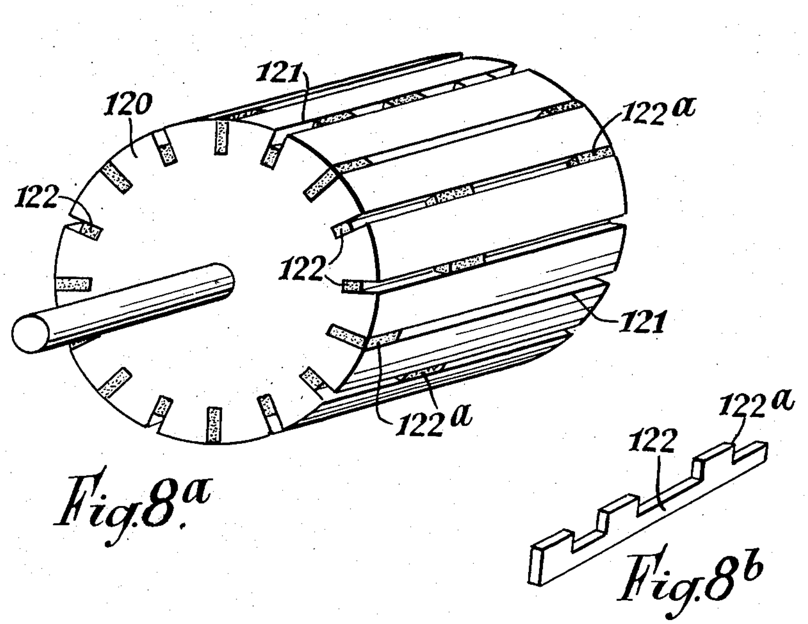
FIGS. 8*a*, 8*b*, 8*c* and 8*d* illustrate embodiments of a pulse generator.

FIG. 8*a* is a perspective view of an embodiment of a pulse generator comprising a cylindrical rotary carrier 160 of a non-magnetic material having axially arranged slots 161 in which are held permanent magnets 162 each having a number of lugs $162^a$ representing a code combination. When the magnets are in the slots, the outer edge faces of the lugs $162^a$ lie in the surface of the carrier and can be sensed by a sensing head for the generation of a pulse.

The elements 162 could be made by punching from a sheet of suitable material and be magnetized after punching. They may be held in the slots 161 merely by being forced in, or there may be additional holding means (not shown) such as a ring pressed into slots in the end faces of the magnets. FIG. 8*b* illustrates a magnet element of the embodiment of FIG. 8*a*.

Figure 8C:
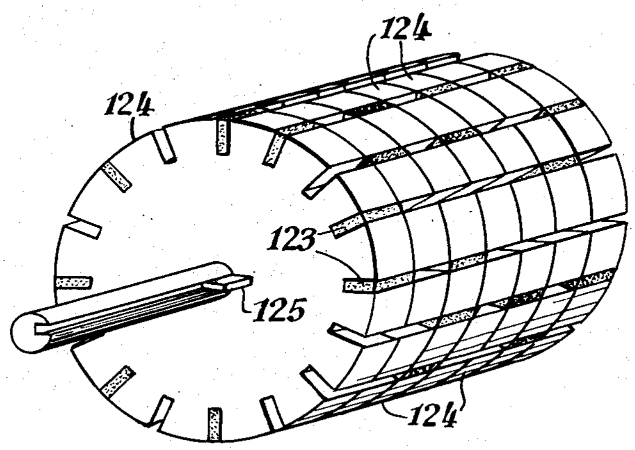
Figure 8D:
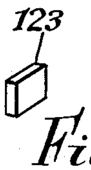

Instead of each combination being represented by a single one-piece magnet, it may be represented by separate magnets 163 either arranged in individual slots of a carrier, in positions according to the combination concerned. Alternatively, as shown in FIG. 8*c*, a plurality of adjacent discs 164 may be provided, one for each channel of the code combination, said discs being held in register as by a key 165. The magnets 163 will be spaced in the respective discs to make up the desired combinations in the axial direction. FIG. 8*d* shows a magnet element 163 of the embodiment of FIG. 8*c*.

An advantage of this type of generator is that the pulses produced are of considerable amplitude, for example, 4 volts, so that the size of the air-gap between the magnets and the sensing heads is not critical.

Figure 7:
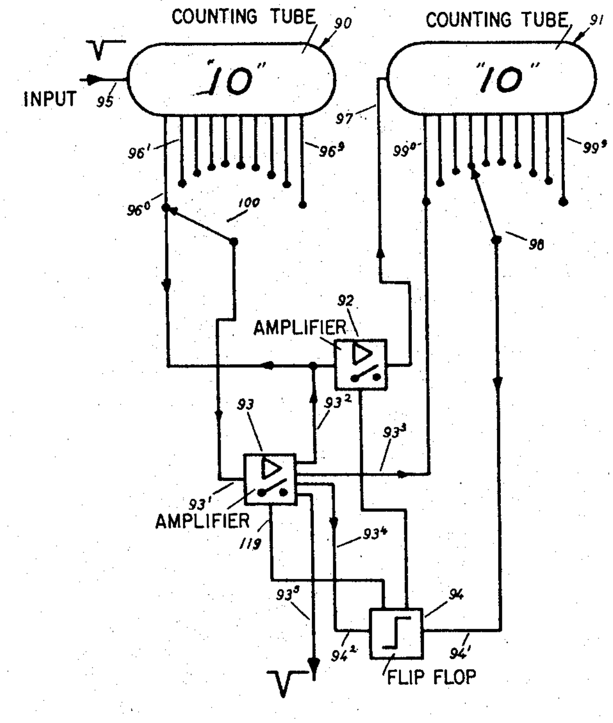
FIG. 7 is a schematic diagram of an embodiment of a counter which may be utilized in the embodiment of FIG. 1.

FIG. 7 is an embodiment of a counter 28 or 29. The counter includes two ten-stage counting tubes 90 and 91 as well as two controlled amplifiers 92 and 93 and flip-flop 94. The operation of the counter is as follows. Initially, the amplifier 92 is made operative by flip-flop 94, while amplifier 93 is inoperative. The pulses entering at input lead 95 advance therefore the ten-stage counting tube 90 step by step. After ten pulses, a positive output pulse is delivered to output lead $96^0$, which is conducted through amplifier 92 to the input lead 97 of the ten-stage counting tube 91. Each such pulse advances the counting tube 91 by one stage. As the counting tube 91 is advanced to the stage to which switch 98 is adjusted, then a positive pulse is delivered through the respective one of the leads $99^{0-9}$ and through the switch 98 to the input lead $94^1$ of flip-flop 94. The flip-flop 94 will thereby be switched over to its opposite state. Amplifier 92 will thereby be rendered inoperative and amplifier 93 will be rendered operative.

If the counter 90 is then counted on by the pulses entering at input lead 95 up to that stage to which switch 100 is adjusted, the output pulse delivered to that one of the output leads $96^{0-9}$ will enter the amplifier 93 through switch 100 and input lead $93^1$ of amplifier 93.

After the pulse has been amplified by amplifier 93 it is delivered as a negative pulse through output lead $93^2$ to the output lead $96^0$ of the counter 90 and switches this back to the digit value "0." Simultaneously, a negative pulse is fed to counting tube 91 through output lead $93^3$ to lead $99^0$, whereby said counting tube is switched back to the zero position. A positive pulse is fed to flip-flop 94 through output lead $93^4$ and input lead $94^2$, whereby said flip-flop is switched back into its initial state. The amplifier 93 will thereby be rendered inoperative and the amplifier 92 will be rendered operative again. A negative pulse is delivered through output lead $93^5$, which may be used for the control of other switching functions. In the example shown, the counter is adjusted to a counting capacity of 40 pulses, i.e. 40 pulses have to be supplied to the counter at input lead 95 before an output pulse is delivered through output lead $93^5$.

The first 30 of the 40 pulses counts the counting tube 90 through three times and the output lead $96^0$ receives three output pulses, which advance the counting tube 91 by three stages. The third of these pulses switches the glow discharge within counting tube 91 to output lead $99^3$ and a positive output pulse is delivered through said lead. The output pulse is supplied to the flip-flop 94 through switch 98 and initiates the aforedescribed switching-over process. The following thirty-first pulse at input lead 95 advances the counting tube 90 from the counting stage position "0" to the counting stage position "1" and so on, until the counting stage position "0" is reached again at the fortieth pulse. The output pulse delivered thereby to output lead $96^0$ is supplied to the amplifier 93 through switch 100, whereby the aforedescribed switching functions may be actuated and the counter is prepared for the beginning of a new counting cycle.

What I claim is:

1. Apparatus for recording coded representations of characters and for indicating the character widths associated with such characters comprising a character keyboard for entering each character to be recorded, a continuously rotating drum carrying a pattern of magnetized elements on the surface thereof, a plurality of magnetic reading heads associated with the drum, the said elements being so disposed in a plurality of circumferential tracks, each of which is sensed by one of said reading heads, that a first group of said heads generate during each revolution of the drum a first sequence of pulses representing in coded form all possible characters which may be entered by the keyboard and that a second group of said heads generate during each revolution a second sequence of pulses which represent in coded form the character widths associated with the character represented by the first sequence of pulses, first and second gating circuits to which the first and second sequences of pulses, respectively are appled, a control circuit common to the two gating circuits, first switching means settable by keys of said keyboard, second switching means operating in synchronism with the rotation of said drum, means controlled jointly by the first and second switching means and operative on depression of a character key of the keyboard to apply a signal to the control circuit to render the gating circuits operative to pass pulses from said sequences of pulses, the time in the revolution of the drum at which said signal occurs being determined by which of the character keys is depressed, a tape punch responsive to pulses passed by the first gating circuit to record coded perforations corresponding to the character represented by said depressed key, a pulse counter responsive to pulses passed by the second gating circuit, means for deriving carry pulses from the counter, and a character width indicator operated by the carry pulses.

2. Apparatus as claimed in claim 1, having further groups of tracks on the drum and associated magnetic reading heads, each such further group generating a sequence of pulses representing a different set of character widths for the characters represented by said first sequence of pulses, and switching means settable to apply any one of the character width representing sequences of pulses to said second gating circuit.

3. In a keyboard operated apparatus for recording coded character representations and control signals for controlling line composing machinery, in combination, a plurality of character width count magazines each corresponding to characters of a type face independent from the type faces represented by the others of said character width count magazines, each of said character width count magazines providing a group of signals representing the character widths of the characters thereof, the character width represented by each of said groups of signals being independent from the character widths represented by the others of said groups of signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line; recording means for recording coded character representations and control signals for controlling line composing machinery; and transfer means for transferring character signals from said keyboard to said recording means for recording coded character representations and for transferring the digit values of a group of signals from a selected one of said character width count magazines to said counting means.

4. In keyboard operated apparatus for recording coded character representations and control signals for controlling line composing machinery, in combination, a plurality of character width count magazines each corresponding to characters of a type face independent from the type faces represented by the others of said character width count magazines, each of said character width count magazines providing a group of signals representing the character widths of the characters thereof, the character width represented by each of said groups of signals being independent from the character widths represented by the others of said groups of signals, each of said character width count magazines comprising a diode matrix arrangement; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line; recording means for recording coded character representations and control signals for controlling line composing machinery; and transfer means for transferring character signals from said keyboard to said recording means for recording coded character representations and for transferring the digit values of a group of signals from a selected one of said character width count magazines to said counting means.

5. In keyboard operated apparatus for recording coded character representations and control signals for controlling line composing machinery, in combination, a plurality of character width count magazines each corresponding to characters of a type face independent from the type faces represented by the others of said character width count magazines, each of said character width count magazines providing a group of signals representing the character widths of the characters thereof, the character width represented by each of said groups of signals being independent from the character widths represented by the others of said groups of signals, each of said character width count magazines comprising a diode matrix arrangement; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line, each of said diode matrix arrangements comprising a first group of conductors connected to said keyboard and a second group of conductors connected to said counting means through corresponding selective switching means; recording means for recording coded character representations and control signals for controlling line composing machinery; and transfer means for transferring character signals from said keyboard to said recording means for recording coded character representations and for transferring the digit values of a group of signals from a selected one of said character width count magazines to said counting means.

6. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals; a keyboard comprising a plurality of keys adapted to provide character signals representing characters and control signals representing operating controls for line composing machinery; said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the digit values of a second group of signals from a selected one of said character width count magazines to said counting means.

7. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals; converting means for converting the character width signals provided by said character width count magazines to character width pulses representing the character widths represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; pulse counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the character width pulses corresponding to the character width signals of a selected one of said character width count magazines to said counting means.

8. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals, each of said character width count magazines comprising a diode matrix arrangement; converting means for converting the character width signals provided by said diode matrix arrangements to character width pulses representing the character widths represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; pulse counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the character width pulses corresponding to the character width signals of a selected one of said diode matrix arrangements to said counting means.

9. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals, each of said character width count magazines including a rotatable magnetic medium having character width signals recorded thereon and a plurality of sensing means in operative proximity therewith; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the digit values of a second group of signals from a selected one of said character width count magazines to said counting means.

10. In keyboard operated apparatus for recording coded character representations and control signals for controlling line composing machinery, in combination, character representing means for providing a first group of signals representing characters to be recorded in said line composing machinery, said character representing means including a rotatable magnetic medium having character signals recorded thereon and a plurality of sensing means in operative proximity therewith; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals, each of said character width count magazines including a rotatable magnetic medium separate from the rotatable magnetic mediums of the others of said character width count magazines and having character width signals recorded thereon and a plurality of sensing means in operative proximity therewith; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the digit values of a second group of signals from a selected one of said character width count magazines to said counting means.

11. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals; converting means for converting the character width signals provided by said character width count magazines to character width pulses representing the character widths represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; pulse counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the character width pulses corresponding to the character width signals of a selected one of said character width count magazines to said counting means, said transfer means including gating control means controlled by said character width signals and time control signals provided by selected keys of said keyboard and adapted to control the transfer of said first group of signals to said recording means and to control the transfer of said character width pulses to said counting means.

12. In keyboard operated apparatus for recording coded character representations and control signals for controlling line composing machinery, in combination, character representing means for providing a first group of signals representing characters to be recorded in said line composing machinery; a plurality of character width count magazines each corresponding to characters of a type face independent from the type faces represented by the others of the character width count magazines, each of said character width count magazines providing a second group of signals representing the character widths of the characters thereof, the character width represented by each of said second groups of signals being independent from the character widths represented by the others of said second groups of signals; converting means for converting the character width signals provided by said character width count magazines to character width pulses representing the character width represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; pulse counting means for determining remaining line space available for the insertion of further characters in a line; recording means for recording coded character representations and control signals for controlling line composing machinery; and transfer means for transferring a first group of signals from said character representing means to said recording means for recording coded character representations and for transferring the character width pulses corresponding to the character width signals of a selected one of said character width count magazines to said counting means, said transfer means comprising first gating means connected between said character representing means and said recording means and adapted to assume one of a conductive condition in which said first group of signals is conducted to said recording means through said first gating means and a non-conductive condition in which said first group of signals is blocked from the said recording means by the said first gating means under the control of time control signals provided by selected keys of said keyboard, second gating means connected between said character width count magazines and said counting means and adapted to assume one of a conductive condition in which said character width pulses are conducted to said counting means through said second gating means and a non-conductive condition in which said character width pulses are blocked from the said counting means by the said second gating means under the control of time control signals provided by selected keys of said keyboard and character width signals from said selected one of said character width pulse magazines.

13. In keyboard operated apparatus for recording coded character representations and control signals for controlling line composing machinery, in combination, a plurality of rotatable drums each having a magnetizable surface and having a plurality of circumferential tracks with a plurality of signals recorded in said tracks; a plurality of groups of sensing means positioned in operative proximity with the tracks of the surface of each of said drums; character representing means for providing a first group of signals representing in binary code characters to be recorded in said line composing machinery; a plurality of exchangeable character width count magazines each corresponding to characters of a type face independent from the type faces represented by the others of the character width count magazines, each of said character width count magazines comprising an independent one of said plurality of drums and a group of sensing means positioned in operative proximity with the tracks of said one of said drums in a manner whereby each of said groups of sensing means provides in each revolution of the corresponding drum a second group of signals representing in binary code the character widths of the characters represented by the signals recorded in the group of tracks corresponding therewith, the character width represented by the group of signals generated by each of said groups of sensing means being independent from the character widths represented by the groups of signals generated by the others of said groups of sensing means; converting means for converting the character width binary code signals provided by said character width count magazines to character width pulses representing the character widths represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; recording means for recording coded character representations and control signals for controlling line composing machinery, line length and space counting means for determining remaining line space available for the insertion of further characters in a line; remaining line space indicating means adapted to be controlled by pulses; carry means for deriving carry pulses from said line length and space counting means and for applying said carry pulses to said remaining line space indicating means; and transfer means for transferring a first group of signals from said character representing means to said recording means for recording coded character representations and for transferring the character width pulses corresponding to the character width signals of a selected one of said character width count magazines to said line length and space counting means, said transfer means comprising first gating means connected between said character representing means and said recording means and adapted to assume one of a first conductive condition in which said first group of signals is conducted to said recording means through said first gating means and a non-conductive condition in which said first group of signals is blocked from the said recording means by the said first gating means, second gating means connected between said character width count magazines and said line length and space counting means and adapted to assume one of a conductive condition in which said character width pulses from said converting means are conducted to said line length and space counting means through said second gating means and a non-conductive condition in which said character width pulses are blocked from the said line length and space counting means by the second gating means under the control of character width signals from said selected one of said character width pulse magazines, and gate control switching means connected to said first and second gating means and adapted to assume one of a conductive condition in which said first and second gating means are made conductive and a non-conductive condition in which said first and second gating means are made non-conductive under the control of time control signals provided by selected keys of said keyboard.

14. In keyboard operated apparatus for perforating a tape with coded character representations and control signals for controlling line composing machinery, in combination, a plurality of rotatable drums each having a magnetizable surface and having a plurality of circumferential tracks with a plurality of signals recorded in said tracks; a plurality of groups of sensing means positioned in operative proximity with the tracks of the surface of each of said drums; character representing means for providing a first group of signals representing in binary code characters to be recorded in said line composing machinery; a plurality of exchangeable character width count magazines each corresponding to characters of a type face independent from the type faces represented by the others of the character width count magazines, each of said character width count magazines comprising an independent one of said plurality of drums and a group of sensing means positioned in operative proximity with the tracks of said one of said drums in a manner whereby each of said groups of sensing means provides in each revolution of the corresponding drum a second group of signals representing in binary code the character widths of the characters represented by the signals recorded in the groups of tracks corresponding therewith, the character width represented by the group of signals generated by each of said groups of sensing means being independent from the character widths represented by the group of signals generated by the others of said groups of sensing means; converting means for converting the character width binary code signals provided by said character width count magazines to character width pulses representing the character widths represented by said character width signals; a keyboard comprising a plurality of keys adapted to provide character signals representing characters and control signals representing operating controls for line composing machinery, said operating control signals including selection control signals for the selection of one of said character width count magazines; selective switching means controlled by selected keys of said keyboard for selecting one of said character width count magazines in accordance with a desired type face to be recorded in said line composing machinery; a tape; perforating means for perforating said tape with coded character representations and control signals for controlling line composing machinery; line length and space counting means for determining remaining line space available for the insertion of further characters in a line; remaining line space indicating means adapted to be controlled by pulses; carry means for deriving carry pulses from said line length and space counting means and for applying said carry pulses to said remaining line space indicating means; and transfer means for transferring a first group of signals from said character representing means to said perforating means for recording coded character representations and for transferring the character width pulses corresponding to the character width signals of a selected one of said character width count magazines to said line length and space counting means, said transfer means comprising first gating means connected between said character representing means and said perforating means and adapted to assume one of a first conductive condition in which said first group of signals is conducted to said perforating means through said first gating means and a non-conductive condition in which said first group of signals is blocked from the said perforating means by the said first gating means, second gating means connected between said character width count magazines and said line length and space counting means and adapted to assume one of a conductive condition in which said character width pulses from said converting means are conducted to said line length and space counting means through said second gating means and a non-conductive condition in which said character width pulses are blocked from the said line length and space counting means by the said second gating means under the control of character width signals from said selected one of said character width pulse magazines, and gate control switching means connected to said first and second gating means and adapted to assume one of a conductive condition in which said first and second gating means are made conductive and a non-conductive condition in which said first and second gating means are made non-conductive under the control of time control signals provided by selected keys of said keyboard.

References Cited in the file of this patent

UNITED STATES PATENTS

| | | |
|---|---|---|
| 2,765,895 | Higonnet et al. | Oct. 9, 1956 |
| 2,848,049 | Robbins et al. | Aug. 19, 1959 |